Aug. 15, 1972   R. DE JESUS PEDRAZA   3,684,632
LAMINATED PALLET AND METHOD OF MAKING SAME
Filed Feb. 4, 1971   5 Sheets-Sheet 1
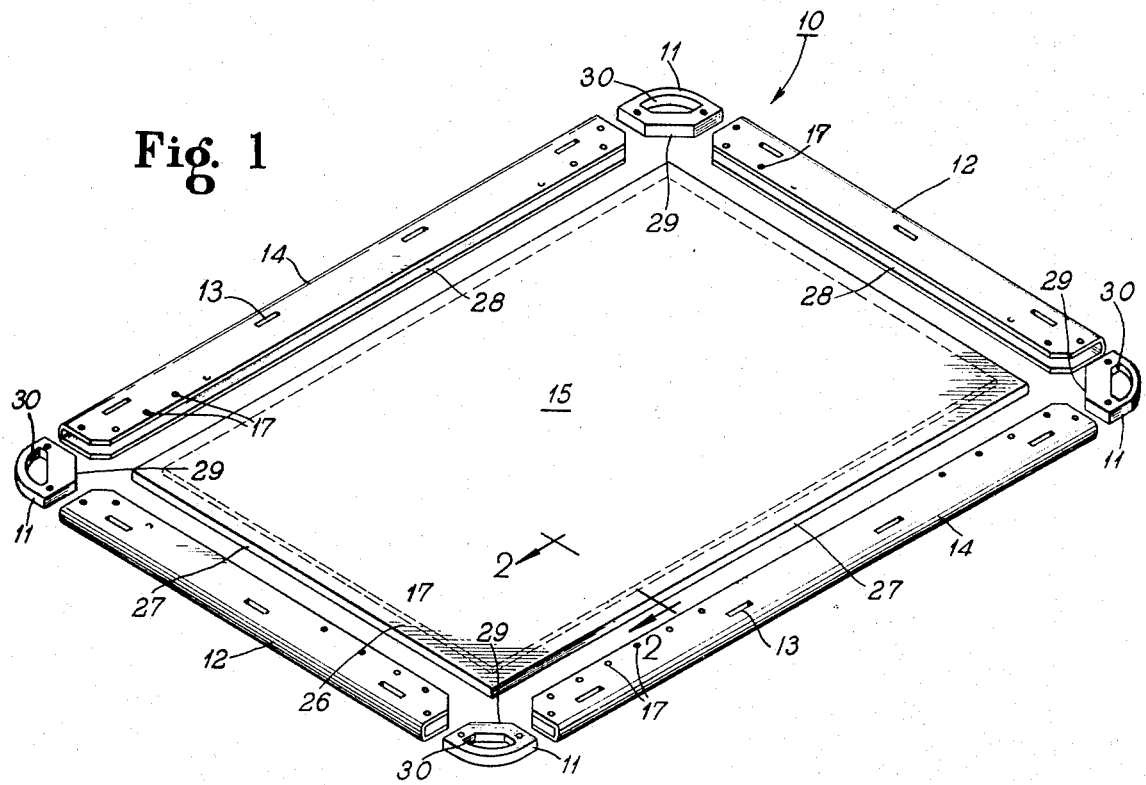
Fig. 1
Fig. 2
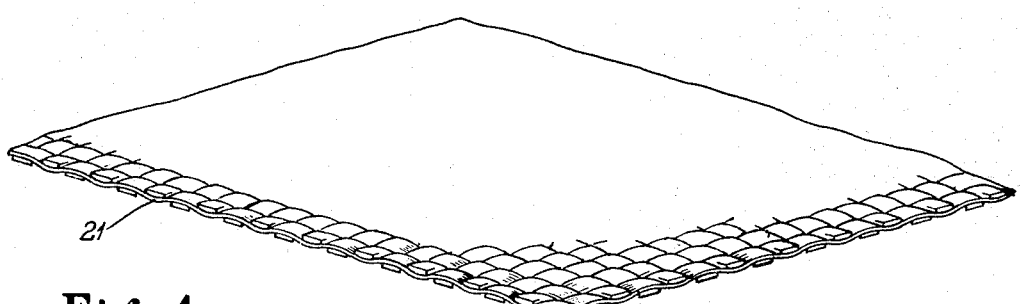
Fig. 4
INVENTOR.
Rafael De Jesus Pedraza
BY
*Dominik, Knechtel & Godula*
ATTORNEYS

United States Patent Office 3,684,632
Patented Aug. 15, 1972

3,684,632
LAMINATED PALLET AND METHOD OF MAKING SAME
Rafael De Jesus Pedraza, 4767 E. 10th Lane, Hialeah, Fla. 33013
Continuation-in-part of abandoned application Ser. No. 10,144, Feb. 10, 1970. This application Feb. 4, 1971, Ser. No. 112,709
Int. Cl. B32b 3/02, 3/18, 31/06, 31/10, 31/12
U.S. Cl. 161—41        18 Claims

ABSTRACT OF THE DISCLOSURE

A laminated flat surface is shown designed primarily for use as a pallet, more particularly one supplied with a rim having tie-downs for the formation of a unit load support intended for use in the support of air freight. The pallet is made up of two layers of wooden strips, each strip being formed at its side edge and abutted against an adjacent strip. One layer is at 90° with the other as to the longitudinal dimension of the strip. The strips of wood are interwoven with a strip of non-oriented fiberglass which fills the gaps between the wooden strips at their opposed edges. A non-woven matting is applied at the upper and lower portion of the mat, and outside the non-woven portion is a woven layer of fabric. In the method of lay-up a flat mold is employed in which a woven layer of fabric is first laid down. Thereafter it is impregnated with a resin. Subsequently the non-woven mat is placed thereatop, and a further layer of resin applied. The first panel of strips is then placed thereatop, the strips being held together by staple means across the adjacent edges. The second panel of strips is placed thereatop, followed by the non-woven mat and thereafter optionally a woven fabric. At each step the layer placed down, and the layers thereatop are repetitively soaked with a resin. When the last layer is placed, and resin soaked thereatop, the units are sandwiched with a top portion of the mold and held in compression for approximately two to three hours in match-mold pressure relationship to thereby utilize the exothermic reaction of the curing resin to impregnate all of the fiberglass members and the wood in a solid unit. Optionally the edges may be beveled, and after a cure time of two or three hours, the peripheral rails and corner posts are placed into position and the mat is completed.

---

A laminated pallet and method of making the same are disclosed and described, the pallet finding its principal utility in air freight applications wherein the pallet is made up into a unit load support freight unit. It will be appreciated, however, as the description of an illustrative embodiment proceeds, that the laminated pallets will also have utility in other support functions apart from that of serving as the base of an igloo intended for use in air freight.

BACKGROUND OF INVENTION

This application is a continuation-in-part of my earlier filed and now abandoned application Ser. No. 10,144 filed Feb. 10, 1970.

Numerous pallets have been disclosed such as those appearing in U.S. Pat. 2,651,486, having one layer spaced from the other, each being elongate elements of board. Patent 2,445,197 is an example of a layer having special convolutions disposed at right angles to an underlying layer. In addition, U.S. Pat. 3,446,692 discloses a sandwich type pallet with sinuous strips imbedded in a plastic material. An alternative construction illustrating strengthening a pallet by grouping a large number of separate strips is shown in Patent 3,059,887. Patent 3,113,532 discloses another pallet conception having beveled edges, but is not adapted for edge contact, nor interwoven with any material to make sure of maximum strength from the strips. Commercial pallets for air freight such as made by Irvin Industries, Inc., Boeing, and Iata usually employ a plywood body.

One or all of the above mentioned patents suffers from numerous disadvantages. For example, a complete waterproof type construction impervious to leakage of contaminants is not described. The strength of the various units, particularly when subjected to piercing objects in the presence of a contaminating fluid is less than desirable. Any penetration of the surface can result in soaking the interior of the baseboard and further weaken the baseboard, or contaminate the same.

OBJECTS AND ADVANTAGES

The present invention seeks to provide a laminated pallet which is lightweight, waterproof, and yet has an unusual strength flexure characteristic, as well as a method for making the same. The method of forming the pallet looks to an economical mold construction, and minimum labor and setup time to thereby manufacture a pallet having the desirable characteristics of the objective of the invention at a minimum cost above and beyond the materials.

SUMMARY OF INVENTION

A laminated flat surface is shown, designed primarily for use as a pallet, more particularly one supplied with a rim having tie-downs intended for use in the support of air freight. The pallet is made up of two layers of wooden or plywood strips, each strip being formed on its side for abutting side to side positioning against an adjacent strip. One layer of panel is at 90 degrees with the other as to the longitudinal axis of the strips. The strips of wood or plywood are interwoven with a strip of non-oriented fiberglass which fills the gaps between the wooden strips and their opposed abutting edges. A non-woven matting is applied at the upper and lower portion of the opposed panels, and outside one or both non-woven portions is a woven layer of fabric. In the method of lay-up, a flat mold is employed in which a flat layer of woven fabric is first laid down. Thereafter it is impregnated with a resin. Subsequently the non-woven mat is placed thereatop, and a further layer of resin applied. The first panel of strips is then placed thereatop, the strips being held together by a staple means. The second panel of strips is placed thereatop, followed by the non-woven mat and thereafter the woven fabric. At each step the layer placed down, and the layers thereatop are repetitively soaked with a resin. When the last layer is placed, and resin soaked thereatop, the units are sandwiched with a top portion of the mold and held in compression for approximately two to three hours in match-mold pressured relationship to thereby utilize the exothermic reaction of the curing resin to impregnate all of the fibrous members and the wood in a solid unit. Optionally, the edges may be beveled, and after a cure time of two to three hours, the peripheral rails and corner posts are placed into position and the mat is completed.

DESCRIPTION OF DRAWINGS

Further objects and advantages of the present invention will become apparent as the following description of an illustrative embodiment of the laminated pallet as well as the method of making the same is shown, in conjunction with the accompanying illustrative drawings, in which:

FIG. 1 is an exploded perspective view of a typical pallet illustrative of the invention.

FIG. 2 is a transverse enlarged sectional view of the pallet body itself taken along section line 2—2 of FIG. 1.

FIG. 4 is a perspective partially diagrammatic view of the woven mat used as the first step in the lay-up of the pallet illustrative of the invention.

ILLUSTRATIVE EMBODIMENT

Figure 3:
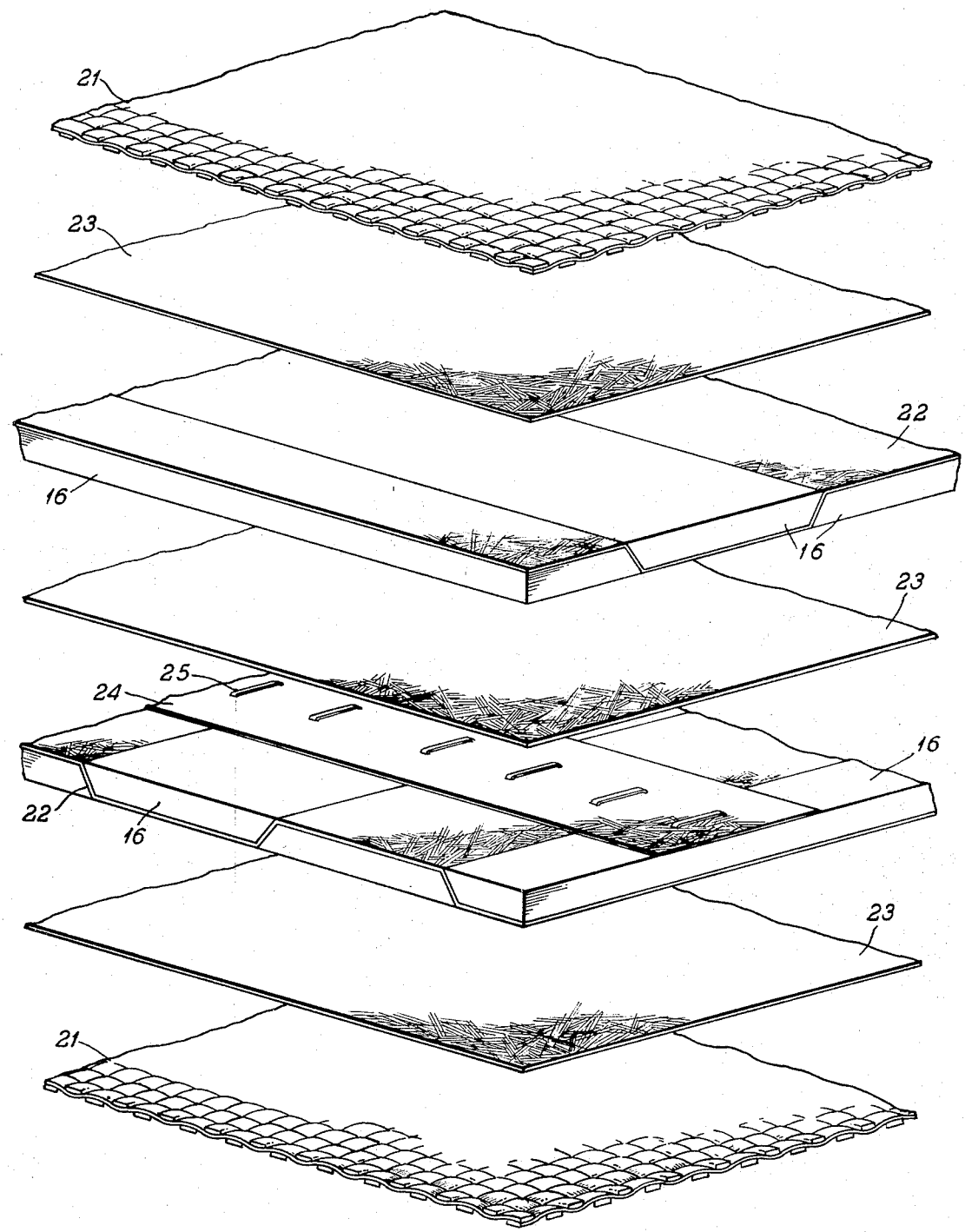
FIG. 3 is an exploded view of the pallet itself showing the relative position of the elements.

A typical pallet 10 illustrative of a pallet employing the baseboard of the present invention is shown in FIG. 1. There it will be seen that the baseboard 15 is surrounded by a pair of side rails 14 and a pair of end rails 12 which contain tie-down slots 13 and are joined at their respective corners by means of corner fittings 11. A plurality of rivet holes 17 are provided to secure the end and side rails 12, 14 to the baseboard 15 by rivets, screws, or other fasteners adapted for the purpose. The corners 11 are solidly secured to the ends of the rails. In those applications where a flush joint between the rails and the baseboard 15 is desired, the baseboard 15 can be undercut or beveled at its edge portions as shown by the dotted lines in FIG. 1.

Particularly to be emphasized in the present invention is the configuration and orientation of the wood strips 16. As shown in FIG. 2, each strip has an isosceles trapezoidal cross-section. Further, the strips are placed down in two layers, each at a perpendicular relationship with the other to present a cross-sectional configuration as seen in FIG. 2. The strips are preferably made of dried hemlock, although other lightweight woods which are sufficiently permeable to the resin bonding material may be employed. Indeed, for the lightest possible construction, a balsa wood may even be used.

As further shown in FIG. 2, the beveled edges 18 are on both sides of the wood strips 16 thereby defining a narrow side 19 and a wide side 20. They are laid up in alternative narrow and wide side relationship with a strip of non-woven fiberglass mat 22 running between the beveled edges 18 and along the narrow sides 19. At the top and the bottom of each baseboard 15, as shown particularly in FIG. 2 and elsewhere described, is a woven mat 21 with an internally adjacent non-woven mat 23. Thus the preferred construction has a non-woven mat 22 running between the strips of wood, a non-woven mat 23 on the outside of both strips of wood, and a woven mat 21 at the outer portion of the baseboard 15. Optionally the woven mat may be covered with another non-woven mat for a smoother exterior finish, or the positions of the woven mat 21 and the non-woven mat 23 may be reversed.

The relative positions of the elements which make up the baseboard 15 are shown in the exploded view of FIG. 3, exclusive of the application of the resin and of the lamination process.

Further details of construction of the baseboard 15 will become apparent as the method of manufacture is described. Firstly, as shown in FIG. 4, a layer of woven fiberglass 21 (if that is to be the exterior layer) is laid atop a match-mold base. It is then soaked with a resin, such as a polyester of the type sold as DR-34 by Marco Chemical (formerly W. R. Grace Company), Southern Resin & Solvent Division, of Miami, Fla., which may be sprayed on, or brushed on, or applied with a roller. The bonding polyester is applied at all points of contact between the interwoven web and elements of the various layers. The fiberglass matting is Chop. Str. Mat M–700, ¾ oz. manufactured by Owens-Corning Fiberglass. A preferred size for the unit dictates the employment of a molding table approximately 88" x 125", although it will be appreciated that the particular size of the baseboard 15 of the pallet 10 is not critical to the invention, but nevertheless is illustrative of the size of the baseboard 15 which can be made in approximately a ¾" thickness which, when unsupported except by the edge rails, will hold a satisfactory load for an air freight load support.

Figure 5:
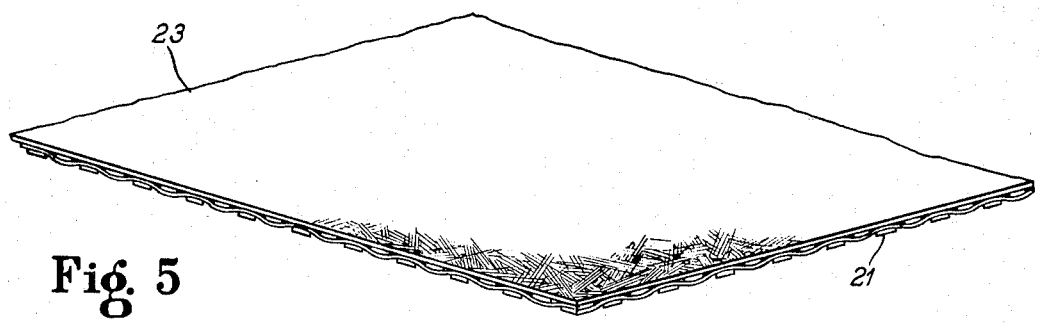
FIG. 5 is a sequential view of the woven mat with its associated non-woven fiberglass mat lying thereon.
Figure 6:
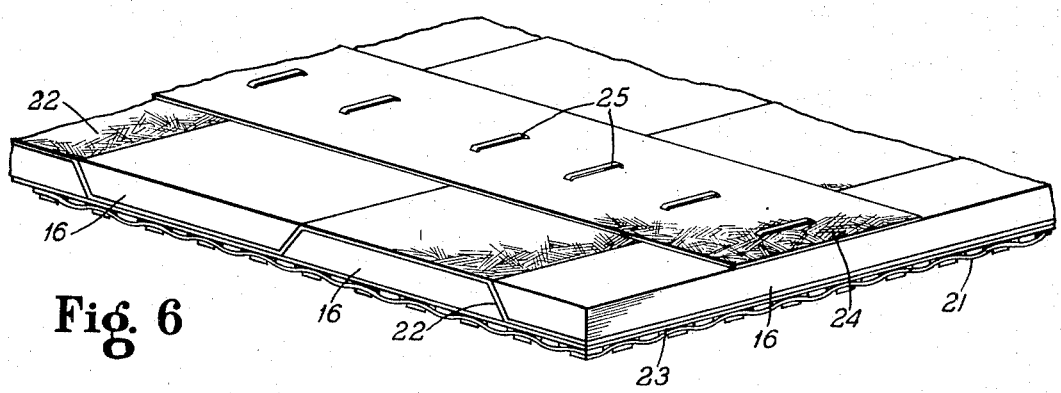
FIG. 6 is a perspective partially broken view with one layer of wood strips with its securing means shown having been placed on the fiberglass mats of FIG. 5.

Continuing with the method, it will be seen from FIG. 5 that a non-woven mat 23 is placed on top of the woven mat 21 of FIG. 4. It is then soaked with a resin of the type described above. Thereafter, the first wood strips 16 are placed atop the configuration of FIG. 5 as shown in FIG. 6. The wooden strips 16 are held together by means of a tie strip 24 which is stapled at convenient locations to the wood strips 16 by means of staples 25.

As can be seen from the method of construction, the wooden strips 16 for added convenience may be preassembled with the tie strip 24, staples 25, and non-woven mat 22, in lengths greater than those used in each layer of the baseboard 15 and then rolled up for easy storage and transportation. It may then be unrolled and cut into the desired lengths at the assembly point.

Figure 7:
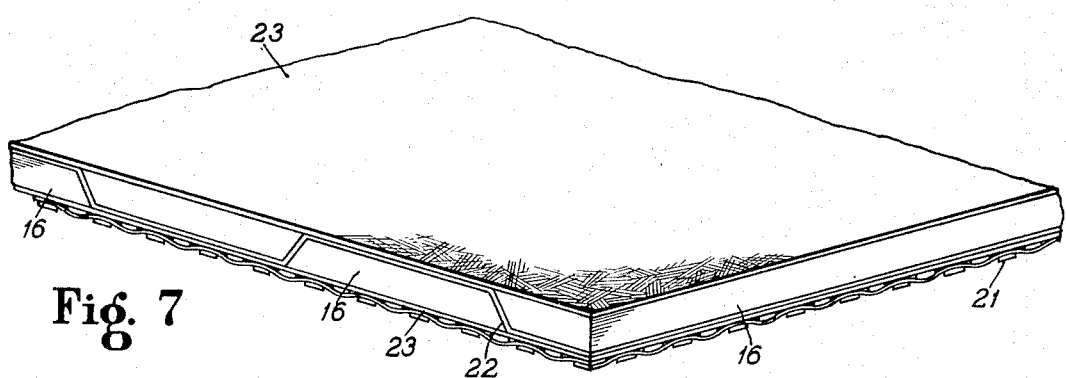
FIG. 7 shows a sequential step after the completion of the placement of one layer of the wood strips as shown in FIG. 6, a non-wover layer being placed thereatop.
Figure 8:
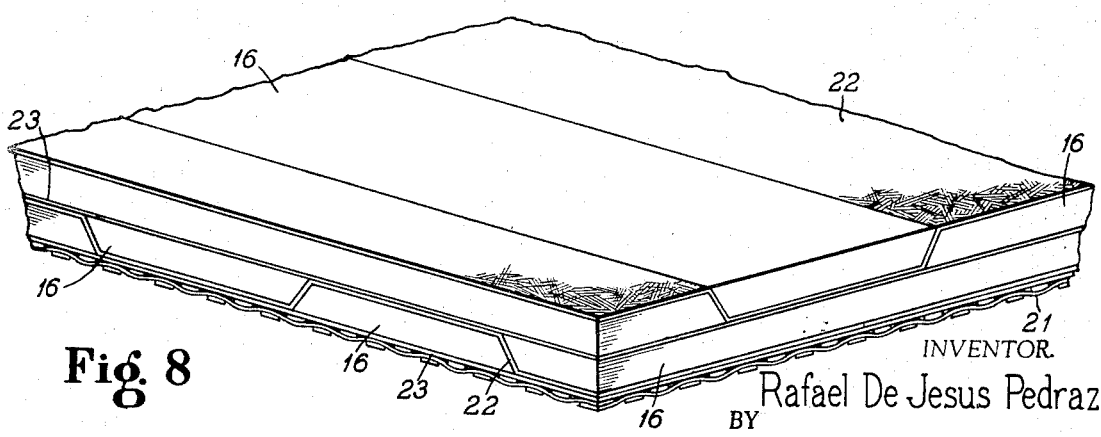
FIG. 8 shows the next roll of beveled strips with their interlocking non-woven fiberglass placed atop the first layer of strips at right angles thereto.

After the rolled strips 16 are laid down a non-woven fiberglass mat 23 is placed thereatop as shown in FIG. 7. Immediately thereafter the non-woven strip 23 is impregnated with resin, and the second rolled layer of wooden strips 16 are placed thereatop in the sandwich-like fashion as shown in FIG. 8, in perpendicular orientation to the first rolled layer of wooden strips 16. Also, as shown in FIG. 3, FIG. 6, and FIG. 8, both rolled layers of wooden strips 16 have the tie strip 24 and the staples 25 positioned on the center-most side of the wooden strips 16 so that after lamination the surface of the baseboard 15 will be smoother than if the tie strip 24 and staples 25 were outwardly facing. For this reason the tie strips 24 and staples 25 of FIG. 8 and of the second layer of wooden strips 16 of FIG. 3 are not shown.

Figure 9:
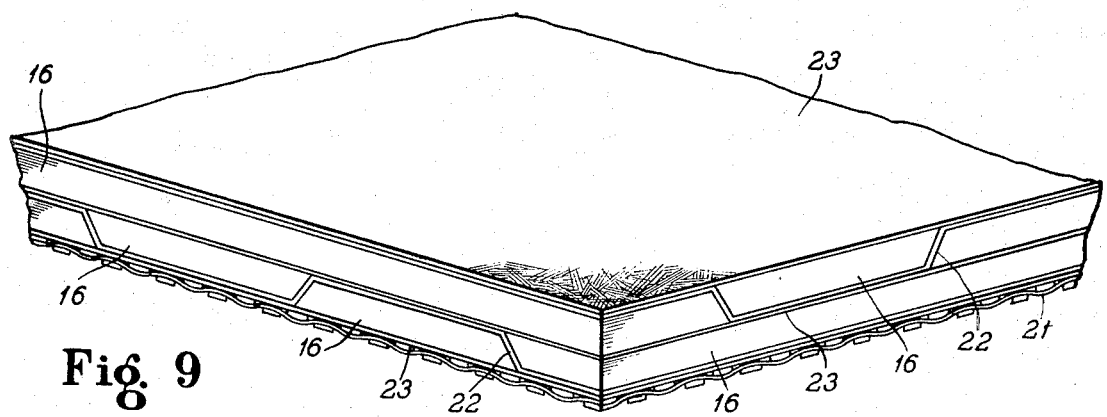
FIG. 9 discloses the next step after FIG. 8 in which a non-woven layer of fiberglass is placed atop the second layer of strips.
Figure 10:
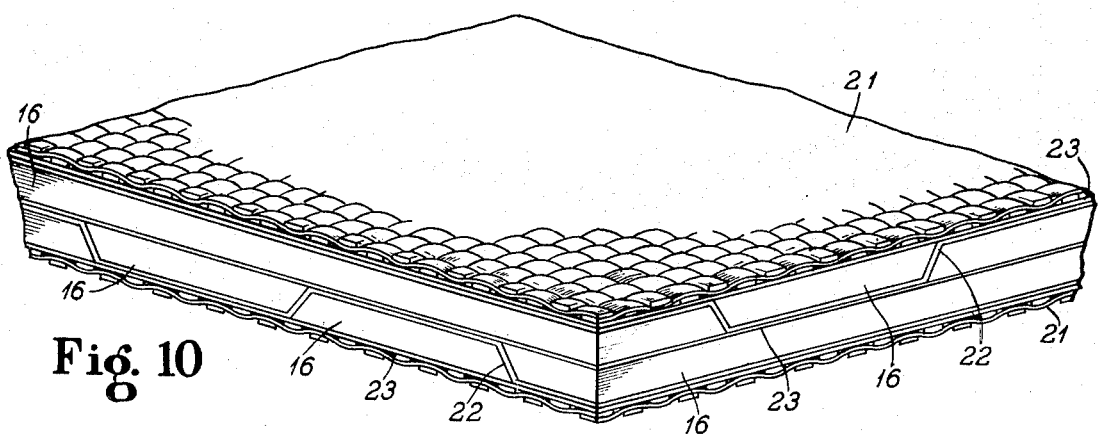
FIG. 10 discloses the final step in laying the woven mat atop the reversely oriented two layers of wooden strips.
Figure 11:
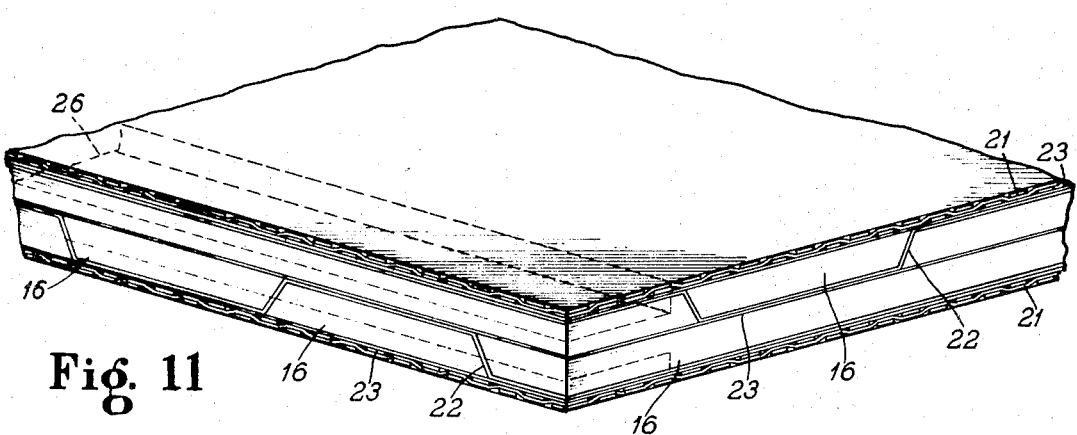
FIG. 11 discloses the final sandwiched construction which may, as shown in the dotted lines along one edge thereof, be beveled to receive the rails and corner joints such as shown in the exploded perspective view of FIG. 1.

Proceeding with the method, a non-woven (or alternatively woven) mat is placed on the sandwiched wooden strips as shown in FIG. 9. The final layer of fiberglass is placed thereatop as shown in FIG. 10, and impregnated with resin. Thereafter a top plate of the mold is placed on the entire unit, and cured under pressure for approximately two to three hours or until the exothermic reaction has cured the polyester, as shown in FIG. 11.

The baseboard 15 is then removed from the matchmold and the side rails 14, end rails 12 and corners 11 secured in the manner shown in FIG. 1.

As illustrated in FIGS. 1 and 2, an undercut 26 may be provided along the edges 27 of the baseboard 15. It will be observed that the undercut preferably cuts the wooden strips 16 in half and the fiberglass, whether woven or unwoven, is placed thereatop and defines a sealed surface where the undercut 26 is inserted into the hollow slotted interior 28 of the end rails 12 and the side rails 14 to be secured by means of rivets or other fasteners passed through the securing holes 17. It will be further observed that the corners 11 have a beveled inner portion 29 which accommodates the corner of the baseboard 15. Additionally the corners 11 as shown have a tie ring 30 for purposes of receiving a line, rope, or hook at the corners of the igloo to be built atop the pallet 10.

ALTERNATIVE EMBODIMENT

Figure 12:
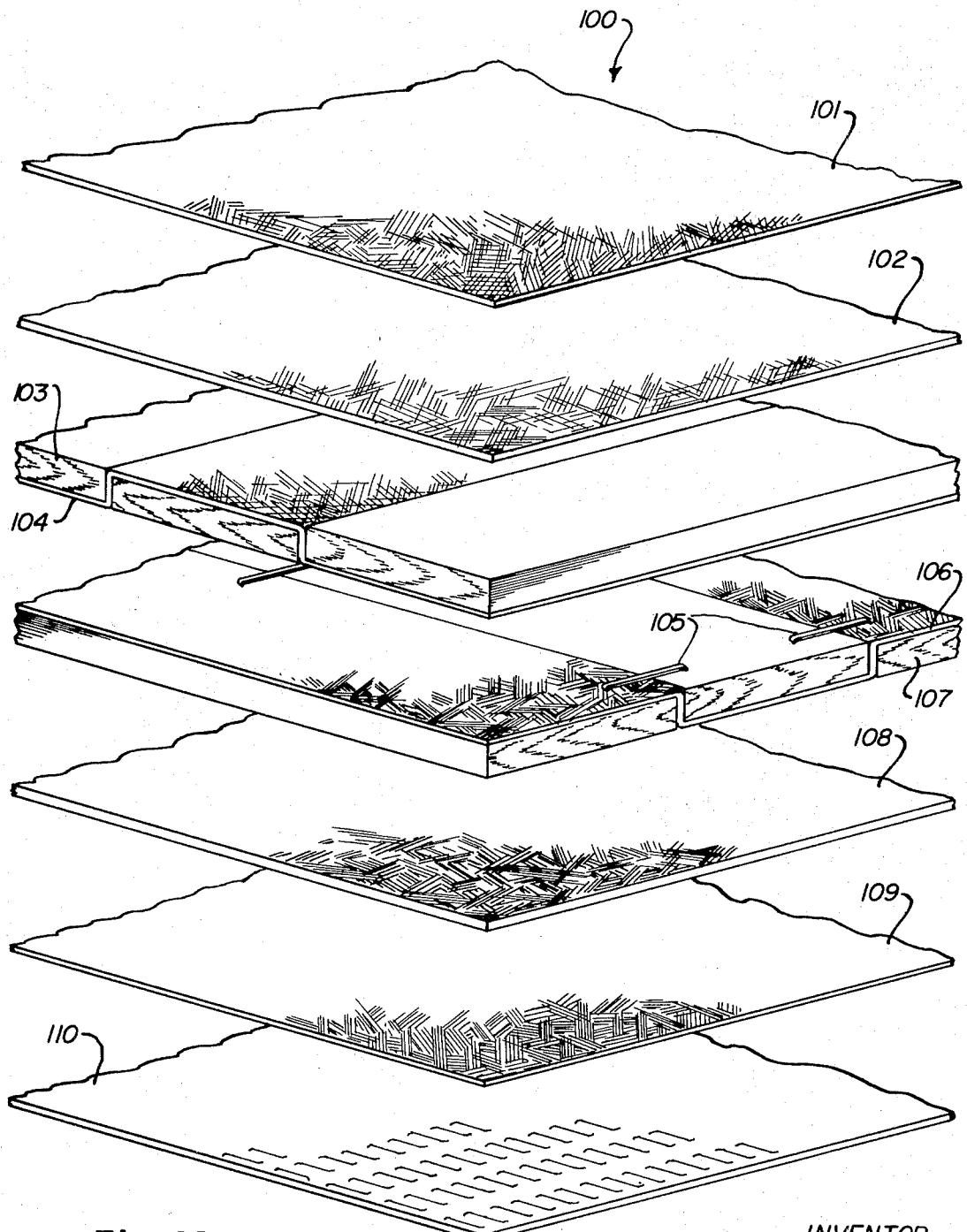
FIG. 12 is an exploded perspective view such as FIG. 3 but showing an alternative embodiment of the pallet baseboard.

An alternative embodiment of the present invention in which the wooden strips are cut to a rectangular cross-section, and the panels are assembled in a slightly different form is shown in FIG. 12.

There it will be seen that the alternative embodiment 100 proceeding from top to bottom has a non-oriented fiberglass layer 101 at the very top. This is a relatively thin mat of non-oriented or non-woven fiberglass compared to the second layer of non-oriented fiberglass 102 placed immediately therebeneath. The wooden strips 103 in combination with the non-oriented fiberglass interwoven with the wooden strips 104, are secured together by means of staple fasteners 105 which are placed in increments of eight inches to firmly secure the fiberglass wooden strip curtains or panels together.

As with the previously discussed embodiment, the two panels made up of the wooden strips 103 are positioned in face-to-face relationship with the wooden strips perpendicularly oriented between the adjacent panels. Eliminated from the alternative embodiment 100 shown in FIG. 12 are the tie strips 24 and the non-woven mat 23 positioned in between the panels of wooden strips 16, 103.

After the two adjacent panels of wooden strips 103 (again looking at FIG. 12) there is provided a thick mass of non-oriented fiberglass 108 followed by a thin mass of non-oriented fiberglass 109. The relationship between the mass of fiberglass 101 and 102 and 108, 109 is thus that the thinner layer is always to the outside of the panel.

At the bottom of FIG. 12 is shown the outer layer 110 which, in this embodiment, comprises a canvas cloth material rather than a fiberglass material. Superior results from a standpoint of hardness has been established with this type material. Two types of canvas have been employed, each with excellent results. The first type is No. 10–14.73 oz. per sq. yd. canvas which meets Government specification CCC–C–419, Type I having a breaking strength of 245 x 160 and a thread count of 45 x 27.

An alternative material, No. 8 canvas, is 18 oz. per sq. yd. and meets Government specifications CCC–C–419, Type I. With the 18-oz. canvas the breaking strength is 285 x 210 and the thread count, 43 x 25.

After the baseboard has been formed in the sequence described above and shown in FIG. 12, the assembly is substantially the same as the method set forth above. Important to both embodiments, of course, is a complete impregnation of all of the woven and non-woven members and at least a partial penetration to the wooden panels made up of the wooden strips 16, 103. The alternative embodiment is less expensive to manufacture inasmuch as the panels of wooden strips 103 are readily laid up with only the use of staples 105. Furthermore, orientation to the edges of the longitudinal strips 103 attributable to the beveled construction of the first embodiment strip 16 is eliminated in the cost of manufacture. The stress characteristics of both embodiments are substantially the same, although as set forth above, by employing the canvas woven matting 110 a superior surface hardness results which reduces the tendency to breaking and cracking due to sharp objects.

As set forth above, the essential feature of the invention is the alternatively layered strips, preferably wood, which are interwoven with fiberglass and impregnated. The strip panels are secured by the staples 25 with optional ties 24 and are a convenience for manufacture, further illustrating a detailed feature of the invention which relates to the ultimate construction as well as a method of providing two strips of wood secured together for rapid lay-up in the mold to thereby conserve the mold time and permit preparation of the materials prior to insertion into the mold which is the most expensive portion of the tooling required for manufacturing the pallet.

Further as stated the use of a woven or roven mat alternatively with a non-woven mat of fiberglass is optional, although experience has indicated that where the woven mats are at the exterior portion, and a non-woven mat interiorly, greater ease of manufacture and superior strength characteristics are exxhibited. Where great strength is not required, of course, the woven mats may be omitted and the non-woven fiberglass substituted on the exterior as well as in the sandwich between the rolled strips of wood.

While the invention has been described in connection with specific embodiments and applications, no intention to restrict the invention to the examples shown is contemplated, but rather to include within the invention all of the subject matter defined by the spirit as well as the letter of the annexed claims.

I claim:
1. A pallet baseboard comprising, in combination,
    a plurality of wooden strips formed along their edges to define a parallel strip-to-strip edge relationship,
    said strips being laid up in parallel relationship in at least two panels with their edges oriented to thereby define spaced joints between the respective edges,
    a non-woven fibrous material woven in between the respective strips along their edges,
    the two panels of wooden strips being positioned with their parallel strips at right angles each to the other, and,
    a fiberglass reinforcing mat exterior to both of the wooden panels, and,
    a resin bonding agent impregnating all of the fibrous material thereby securing the same in bonded sandwiched criss-cross interlocking relationship.
2. In the reinforced pallet baseboard of claim 1, said wooden strips having complementary isosceles trapezoidal cross-sectional configurations.
3. In the reinforced pallet baseboard of claim 2, a non-woven reinforcing mat between the two panels of wooden strips.
4. In the pallet baseboard construction of claim 1 above, a plurality of longitudinal fibrous narrow strips secured at right angles to the longitudinal axis of the wooden strips of each panel thereby holding each panel of wooden strips together for rolling onto the mold atop its adjacent layer.
5. In the reinforced pallet base of claim 1, beveled edges around the periphery, each beveled edge reducing the thickness of the wood portion without reducing the thicknesses of the woven and non-woven reinforced matting.
6. In the reinforced pallet base of claim 1 above,
    a woven fiberglass mat adjacent both the top strip of wood and the bottom strip of wood,
    a non-woven layer of fiberglass atop each woven layer, whereby a woven construction is provided at the outer side of both the top and bottom of the wooden panels, finished by a non-woven smooth surface.
7. In a pallet baseboard of the type defined in claim 1 above, a polyester resin of a long chain polyester with unsaturated double bond cross-linked by a monomer, the same being fully impregnated in all the fibrous layers.
8. In the pallet baseboard construction of claim 2, a plurality of longitudinal fibrous narrow strips secured at right angles to the longitudinal axis of the wooden strips thereby holding one layer of wooden strips together for rolling onto the mold atop its adjacent layer.
9. In the reinforced pallet base of claim 2, beveled edges around the peripehry, each beveled edge reducing the thickness of the wood portion without reducing the thicknesses of the woven and non-woven reinforced matting.

10. In the reinforced pallet base of claim 2,
a woven fiberglass mat adjacent both the top strip of wood and the bottom strip of wood,
a non-woven layer of fiberglass atop each woven layer, whereby a woven construction is provided at the outer side of both the top and bottom of the wooden strips, finished by a non-woven smooth surface.

11. In the reinforced pallet baseboard of claim 1, said strips having a rectangular cross section, and, a layer of canvas providing one exterior plastic impregnated surface of the pallet baseboard.

12. In the reinforced pallet baseboard of claim 11, said panels being positioned in direct face-to-face orientation.

13. In the reinforced pallet baseboard of claim 11, said canvas being at least a 10 oz. weight.

14. In the reinforced pallet baseboard of claim 1, at least a pair of non-oriented fiberglass mats outside each panel.

15. In the reinforced pallet baseboard of claim 14, a layer of canvas providing one exterior plastic impregnated surface of the pallet baseboard.

16. In the reinforced pallet baseboard of claim 15, each of said at least a pair of non-oriented fiberglass mats comprising a thick and thin mat, each thin mat being outside the thick mat in the direction of the two outer faces of the baseboard.

17. In the reinforced pallet baseboard of claim 16, said canvas being at least a 10 oz. weight.

18. The method of making a fiberglass reinforced pallet baseboard comprising the following steps:
forming a plurality of longitudinal strips of wood along the longitudinal grain thereof with a regular cross-section for complementary edge-to-edge relationship,
interweaving a non-woven reinforcing mat between adjacent strips which are positioned to form a joint along the longitudinal edges,
forming a panel by tacking means secured transversely of the longitudinal edges to the longitudinal axis of the wooden strips,
providing a match-mold in which the sequential layers are placed from the bottom to the top, each of the panels of wooden strips being placed thereatop with the respective strips in perpendicular relationship, and,
after layering and impregnating with a polyester, placing a top plate on the match-mold and securing the same with weight and pressure for a period of not less than two hours whereby the exotherm of the curing of the resin and the pressure fully impregnates the matting between the wooden strips and partially impregnates the wooden strip.

References Cited

UNITED STATES PATENTS

| | | | |
|---|---|---|---|
| 2,197,132 | 4/1940 | Lougheed | 156—298 X |
| 2,715,596 | 8/1955 | Hawley | 156—297 X |
| 2,737,227 | 3/1956 | Brummel | 161—132 |
| 3,152,034 | 10/1964 | Tompkins et al. | 161—130 X |
| 3,481,808 | 12/1969 | Wilkins et al. | 156—291 X |

WILLIAM A. POWELL, Primary Examiner

U.S. Cl. X.R.

156—92, 300; 161—37, 44, 55, 78, 82, 93, 118; 214—1; 264—257